(12) United States Patent
Brubeck et al.

(10) Patent No.: US 8,818,021 B2
(45) Date of Patent: Aug. 26, 2014

(54) WATERMARKING OF DIGITAL VIDEO

(71) Applicants: David Brubeck, Pleasanton, CA (US); Stephen Coney, San Francisco, CA (US)

(72) Inventors: David Brubeck, Pleasanton, CA (US); Stephen Coney, San Francisco, CA (US)

(73) Assignee: MobiTV, Inc., Emeryville, CA (US)

( * ) Notice: Subject to any disclaimer, the term of this patent is extended or adjusted under 35 U.S.C. 154(b) by 65 days.

(21) Appl. No.: 13/625,262

(22) Filed: Sep. 24, 2012

(65) Prior Publication Data
US 2014/0086445 A1    Mar. 27, 2014

(51) Int. Cl.
*G06K 9/00*    (2006.01)
(52) U.S. Cl.
USPC .......................................................... 382/100
(58) Field of Classification Search
None
See application file for complete search history.

(56) References Cited

U.S. PATENT DOCUMENTS

| 2007/0140524 A1* | 6/2007 | Kumar et al. | 382/100 |
| 2013/0227293 A1* | 8/2013 | Leddy et al. | 713/176 |
| 2014/0098985 A1 | 4/2014 | Brubeck | |

OTHER PUBLICATIONS

Zou, Dekun, Nicolas Prigent, and Jeffrey Bloom. "Compressed video stream watermarking for peer-to-peer based content distribution network." Multimedia and Expo, 2009. ICME 2009. IEEE International Conference on. IEEE, 2009.*
Schulzrinne, H. et al., "RTP: A Transport Protocol for Real-Time Applications", *The Internet Society*, (2003),1-89.
"[MS-RTSP]: Real-Time Streaming Protocol (RTSP) Windows Media Extensions", *Microsoft Corporation*, (Jul. 5, 2012),1-142.
Pantos, R et al., "HTTP Live Streaming: draft-pantos-http-live-streaming-08", [Online]. Retrieved from the Internet: < http://tools.ietf.org/pdf/draft-pantos-http-live-streaming-08.pdf >, Accessed on Jul. 17, 2012,(Mar. 2012),1-34.
Schulzrinne, H et al., "Real Time Streaming Protocol (RTSP)", *The Internet Society*, [Online]. Retrieved from the Internet: < http://tools.ietf.org/pdf/draft-ietf-mmusic-rfc2326bis-29.pdf >, Accessed on Jul. 17, 2012,(Feb. 1998),74 pgs.
Siglin, Timothy et al., "Unifying Global Video Strategies: MP4 File Fragmentation for Broadcast, Mobile and Web Delivery", *White Paper, Transitions in Technology*, [Online]. Retrieved from the internet: < http://184.168.176.117/reports-public/Adobe/20111116-fMP4-Adobe-Microsoft.pdf >,(Nov. 16, 2011),16 pgs.
"MPEG-4—The Media Standard", [Online]. Retrieved from the Internet: < http://www.m4if.org/public/documents/vault/m4-out-20027.pdf >,(Nov. 19, 2002),30 pgs.

(Continued)

*Primary Examiner* — Nirav G Patel
(74) *Attorney, Agent, or Firm* — Kwan & Olynick LLP

(57) ABSTRACT

Techniques and mechanisms for watermarking of digital video are described herein. According to various embodiments, a request to transmit to a client machine video content based on a video content distribution item may be received. The video content distribution item may be divided into a plurality of video content segments. Designated ones of the video content segments may have a respective plurality of alternate video content segment encodings. Each of the alternate video content segment encodings may include a respective digital watermark. Different digital watermarks may encode different information within the alternate video content segment encodings. One of the respective alternate video content segment encodings may be selected for each of the designated video content segments to create a digital watermarking message to include in the video content. The video content including the selected video content segment encodings may be transmitted to the client machine.

16 Claims, 10 Drawing Sheets

(56) References Cited

OTHER PUBLICATIONS

Sullivan, Gary J., et al., "The H.264/AVC Advanced Video Coding Standard: Overview and Introduction to the Fidelity Range Extensions", *SPIE Conference on Applications of Digital Image Processing XXVII, Special Session on Advances in the New Emerging Standard*, [Online]. Retrieved from the Internet: < http://www.fastvdo.com/spie04/spie04-h264OverviewPaper.pdf >,(Aug. 2004),22 pgs.

"ATSC Digital Television Standard: Part 4—MPEG-2 Video System Characteristics", *Advanced Television Systems Committee, Inc.*, [Online]. Retrieved from the Internet: < http://www.atsc.org/cms/standards/a53/a_53-Part-4-2009.pdf >, (Aug. 7, 2009), 18 pgs.

Wallace, Gregory K., et al., "The JPEG Still Picture Compression Standard", [Online]. Retrieved from the Internet: < http://white.stanford.edu/~brian/psy221/reader/VVallace.JPEG.pdf >,(Dec. 1991),17 pgs.

[MS-RTSP]: Real-Time Streaming Protocol (RTSP) Windows Media Extensions, Microsoft Corporation, Jul. 5, 2012 00:00:00.0.

ATSC Digital Television Standard: Part 4—MPEG-2 Video System Characteristics, Advanced Television Systems Committee, Inc., [Online]. Retrieved from the Internet: < http://www.atsc.org/cros/standards/a53/a_53-Part-Apr. 2009.pdf >, Aug. 7, 2009 00:00:00.0.

MPEG-4—The Media Standard, [Online]. Retrieved from the Internet: < http://www.m4if.org/public/documents/vault/m4-out-20027.pdf >, Nov. 19, 2002 00:00:00.0.

Pantos, R., HTTP Live Streaming: draft-pantos-http-live-streaming-08, [Online]. Retrieved from the Internet: < http://tools.iett.org/pdf/draft-pantos-http-live-streaming-08.pdf >, Accessed on Jul. 17, 2012, Mar. 1, 2012 00:00:00.0.

Schulzrinne, H., Real Time Streaming Protocol (RTSP), The Internet Society, [Online]. Retrieved from the Internet: < http://tools.ietf.org/pdf/draft-ietf-mmusic-rfc2326bis-29.pdf >, Accessed on Jul. 17, 2012, Feb. 1, 1998 00:00:00.0.

Schulzrinne, H., RTP: A Transport Protocol for Real-Time Applications, The Internet Society, Jul. 25, 1905 00:00:00.0.

Siglin, Timothy, Unifying Global Video Strategies: MP4 File Fragmentation for Broadcast, Mobile and Web Delivery, White Paper, Transitions in Technology, [Online]. Retrieved from the internet: < http://184.168.176.117/reports-public/Adobe/20111116-fMP4-Adobe-Microsoft.pdf >, Nov. 16, 2011 00:00:00.0.

Sullivan, Gary J., The H.264/AVC Advanced Video Coding Standard: Overview and Introduction to the Fidelity Range Extensions, SPIE Conference on Applications of Digital Image Processing XXVII, Special Session on Advances in the New Emerging Standard, [Online]. Retrieved from the Internet: < http://www.fastvdo.com/spie04/spie04-h264OverviewPaper.pdf >, Aug. 1, 2004 00:00:00.0.

Wallace, Gregory K., The JPEG Still Picture Compression Standard, [Online]. Retrieved from the Internet: < http://white.stanford.edu/~brian/psy221/reader/Wallace.JPEG.pdf >, Dec. 1, 1991 00:00:00.0.

* cited by examiner

WATERMARKING OF DIGITAL VIDEO

TECHNICAL FIELD

The present disclosure relates to the application of digital watermarks to digital video content.

DESCRIPTION OF RELATED ART

Digital content such as audio, video, and image content may be modified to contain hidden information via digital watermarking techniques. Embedding hidden information in digital content may be used for various purposes. For instance, the information contained in a digital watermark may be used to identify the source of the digital content. If a digital watermark is specific to a content source, then a copy of the digital content may be analyzed subsequent to distribution to identify this source. Such techniques may be used, for example, to facilitate the investigation of copyright infringement. If unauthorized distribution of content occurs and is noticed by the copyright holder, the watermark can be read and the source of the distribution can be identified. Content providers can then take corrective action with the offender to stop the distribution and/or recover financial losses.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
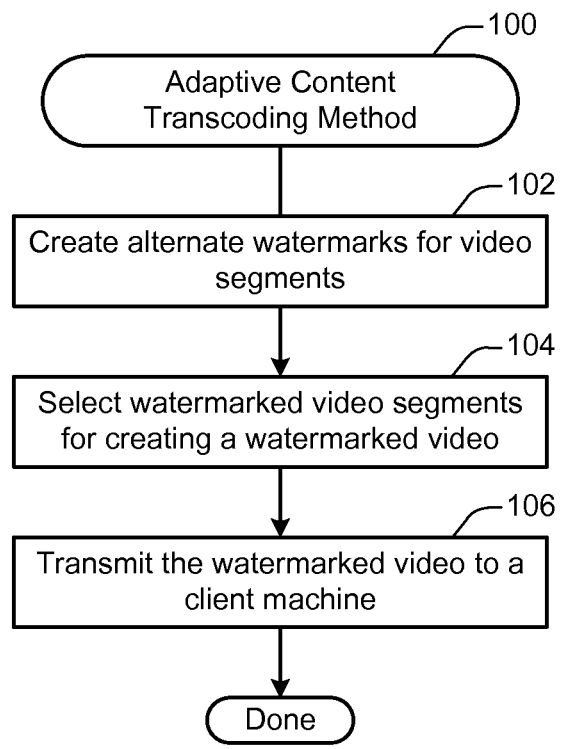
FIG. 1 illustrates an example of a method for adaptive content transcoding.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate the application of different watermarks to media content such as streaming video distributed via super-distribution. In a super-distribution framework, a media content source item may be created for generating copies to transmit to client machines. The media content source item may be divided into segments or fragments to facilitate transmission. When the media content source item is created, different copies of one or more of the segments for the media content source item may be created. Each of these different copies may have a different watermark applied to it. Then, when a copy of the media content source item is transmitted to a client machine, the server may select from the available copies to create a particular data message for including in the media content copy transmitted to the client machine.

Example Embodiments

According to various embodiments, a digital watermark may refer to any information hidden in digital content by a change that generally isn't observable to the remover and that is difficult to remove. The digital content may include video content, audio content, image content, computer programming code, or any other content capable of being stored on a digital storage system. In some cases, a digital watermark may allow the content to be associated with the user. For instance, a different watermark, such as a user identifier, may be applied to content transmitted to different users.

According to various embodiments, digital watermarking may be used for various purposes. For example, digital watermarking may be used to verify the source of the watermarked content by applying different watermarks to content transmitted from different sources. As another example, digital watermarking may be used to identify a content recipient. For instance, digital content such as streaming video transmitted from a server to a client machine may be watermarked with information that identifies the client machine or an account associated with the client machine. Then, if the digital content is recognized at another location, such as on a file sharing network, the digital content may be analyzed to retrieve the watermark. The watermark may then be used to identify the client machine or user account that originally received the watermarked content.

According to various embodiments, super-distribution refers to the process of transmitting media content to client machines by copying a source file or files. That is, rather than separately encoding the media content for each client machine, the media content is encoded and stored as a distribution source. Then, when content is transmitted to client machines, the transmitted content is copied from this distribution source. In particular embodiments, super-distribution may reduce distribution costs by allowing an encoding of digital content to be used for transmitting the content to potentially many different client machines, potentially eliminating the need to separately encode content for each client machine.

According to various embodiments, users may receive content from a content management service. The content management service may facilitate the interaction of users with various types of content services. For instance, the content management service may provide a user interface for managing and accessing content from a number of different content sources. The interface may display content received via a cable or satellite television connection, one or more on-demand-video service providers such as Netflix or Amazon, and content accessible on local or network storage locations. In addition, the interface may be used to access this content on any number of content playback devices.

According to various embodiments, the content management service may receive content from various sources, such as content service providers. Then, the content management service may transcode the content for transmission to client machines. Content transcoding refers to any process for changing data encoded in one format to data encoded in a different format. In particular embodiments, transcoding may involve a lossy process that introduces generation loss into the resulting content encoding. Alternately, or additionally, transcoding may involve a lossless process such as lossless compression or decompression.

According to various embodiments, content sent from a service provider to client machines may be transcoded into various encoding formats for a variety of reasons. For instance, the content may be transcoded so that content may be transmitted to client devices that do not support the original format or that have a relatively limited storage capacity that can better handle a reduced file size. For instance, Cineon and DPX files have been widely used as a common format for digital cinema, but the data size of a two-hour movie is about 8 terabytes, which is much too large for streaming over currently available networks to modern content playback devices.

According to various embodiments, a content item such as a movie may be divided into different segments during the transcoding process. Each segment may include some number of video frames. By dividing the content item into segments, the segments can be transmitted individually to a client machine requesting the content. In this way, content can be streamed to the client machine in segments and can be presented at the client machine as soon as the next unplayed segment is received. Segments are also referred to herein as fragments. A segment or fragment may be of any length. For instance, segments may be some number of seconds or minutes longs.

According to various embodiments, some or all of the segments may have watermarks applied to them. A watermark may be applied to a segment by modifying one or more of the frames included in the segment. In particular embodiments, different encodings of a single segment may be created for transmission to client machines. Each of the different encodings may be the same or similar except for having a different watermark. Then, when the watermark is transmitted to a client machine, the media server transmitting the content may select from among the available encodings for a segment to create the video stream sent to the client machine. By appropriately selecting the encodings for potentially many such segments throughout a video stream, the media server may encode a specific data message in the video stream that may, for instance, be specific to the client machine or a user account associated with the client machine. At the same time, the video stream need not be separately encoded for the client machine, which may help all the video content to be distributed via a super-distribution framework.

In particular embodiments, techniques and mechanisms described herein may be used for HTTP streaming and/or FMP4 streaming technologies. However, the techniques and mechanisms are generally applicable to a wide range of video content technologies.

Although the content is often referred to herein as video content, the techniques and mechanisms described herein are generally applicable to a wide range of content and content distribution frameworks. For example, the content may be media content such as video, audio, or image content. As another example, the content may be digital content other than media, such as computer programming language code.

FIG. 1 illustrates an example of a method 100 for adaptive content transcoding. According to various embodiments, the method 100 may be used to provide video content that includes data encoded in watermarks that are applied to one or more frames of the video content. The video content may be distributed to one or more client machines via a super-distribution framework. The data encoded in the video via watermarking may be designated at the time of distribution of the video to the client machines. In particular embodiments, the method 100 may be performed at a media system, such as the media systems discussed with respect to FIGS. 2 and 3.

At 102, alternate watermarks for video segments are created. According to various embodiments, different watermarks may be applied to different copies of a single video segment. The resulting copies of the video segment may be stored for distribution to client machines. In particular embodiments, not all video segments are watermarked. For instance, video content such as a movie may be divided into many thousands of video segments. Although most of these video segments may be free of watermarking, several hundred may be selected for the application of watermarks. For each of these selected video segments, several copies of the segment may be stored. Each of the copies may be similar except for having a different watermark. Then, when the movie is distributed to a client machine, the distribution server may select from among the available copies of each segments to create a specific data message to include in the video transmitted to the client machine.

According to various embodiments, alternate watermarks for video segments may be created as part of a transcoding process create an encoding of a video content item based on a video content source item. The creation of video content segments is discussed in further detail with respect to FIG. 4. An example of a video content segment created in this fashion is discussed with respect to FIG. 5.

At 104, watermarked video segments are selected for creating a watermarked video. According to various embodiments, different watermarked video segments may be selected to encode a particular data message in the video segments. For instance, if a video includes ten segments that each have two alternate watermarkings, "1" or "0", then a binary number having ten bits may be encoded in the video.

In particular embodiments, video segments may be selected to encode a data message that identifies a recipient of the video. For instance, the data message may identify a content management account that provides access to video content via a network connection. Alternately, or additionally, the data message may identify a source of the video content, an author or producer of the video content, or any other information.

At 106, the watermarked video is transmitted to a client machine. According to various embodiments, the watermarked video transmitted to the client machine may include the video segments selected at operation 104. In some cases, the watermarked video may include other segments that are not watermarked. The selection of watermarked video segments and the transmission of watermarked video to a client machine are discussed in further detail with respect to FIG. 7.

Figure 2:
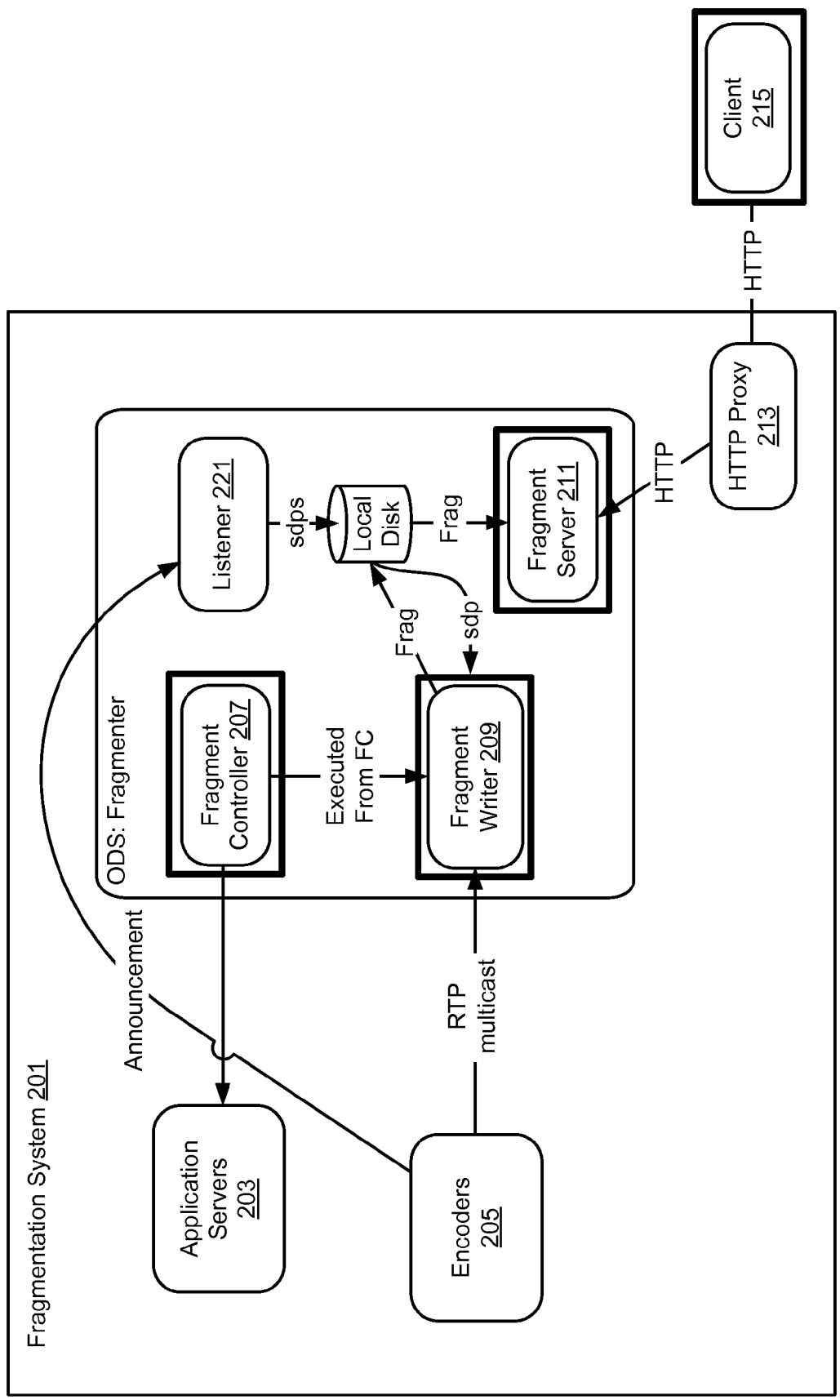
FIGS. 2 and 3 illustrate examples of a media delivery system that can be used with various techniques and mechanisms of the present invention

FIG. 2 is a diagrammatic representation illustrating one example of a fragment or segment system 201 associated with a content server that may be used in a broadcast and unicast distribution network. Encoders 205 receive media data from satellite, content libraries, and other content sources and sends RTP multicast data to fragment writer 209. The encoders 205 also send session announcement protocol (SAP) announcements to SAP listener 221. According to various embodiments, the fragment writer 209 creates fragments for live streaming, and writes files to disk for recording. The fragment writer 209 receives RTP multicast streams from the encoders 205 and parses the streams to repackage the audio/video data as part of fragmented MPEG-4 files. When a new program starts, the fragment writer 209 creates a new MPEG-4 file on fragment storage and appends fragments. In particular embodiments, the fragment writer 209 supports live and/or DVR configurations.

The fragment server 211 provides the caching layer with fragments for clients. The design philosophy behind the client/server application programming interface (API) minimizes round trips and reduces complexity as much as possible when it comes to delivery of the media data to the client 215. The fragment server 211 provides live streams and/or DVR configurations.

The fragment controller 207 is connected to application servers 203 and controls the fragmentation of live channel streams. The fragmentation controller 207 optionally integrates guide data to drive the recordings for a global/network DVR. In particular embodiments, the fragment controller 207 embeds logic around the recording to simplify the fragment writer 209 component. According to various embodiments, the fragment controller 207 will run on the same host as the fragment writer 209. In particular embodiments, the fragment controller 207 instantiates instances of the fragment writer 209 and manages high availability.

According to various embodiments, the client 215 uses a media component that requests fragmented MPEG-4 files, allows trick-play, and manages bandwidth adaptation. The client communicates with the application services associated with HTTP proxy 213 to get guides and present the user with the recorded content available.

Figure 3:
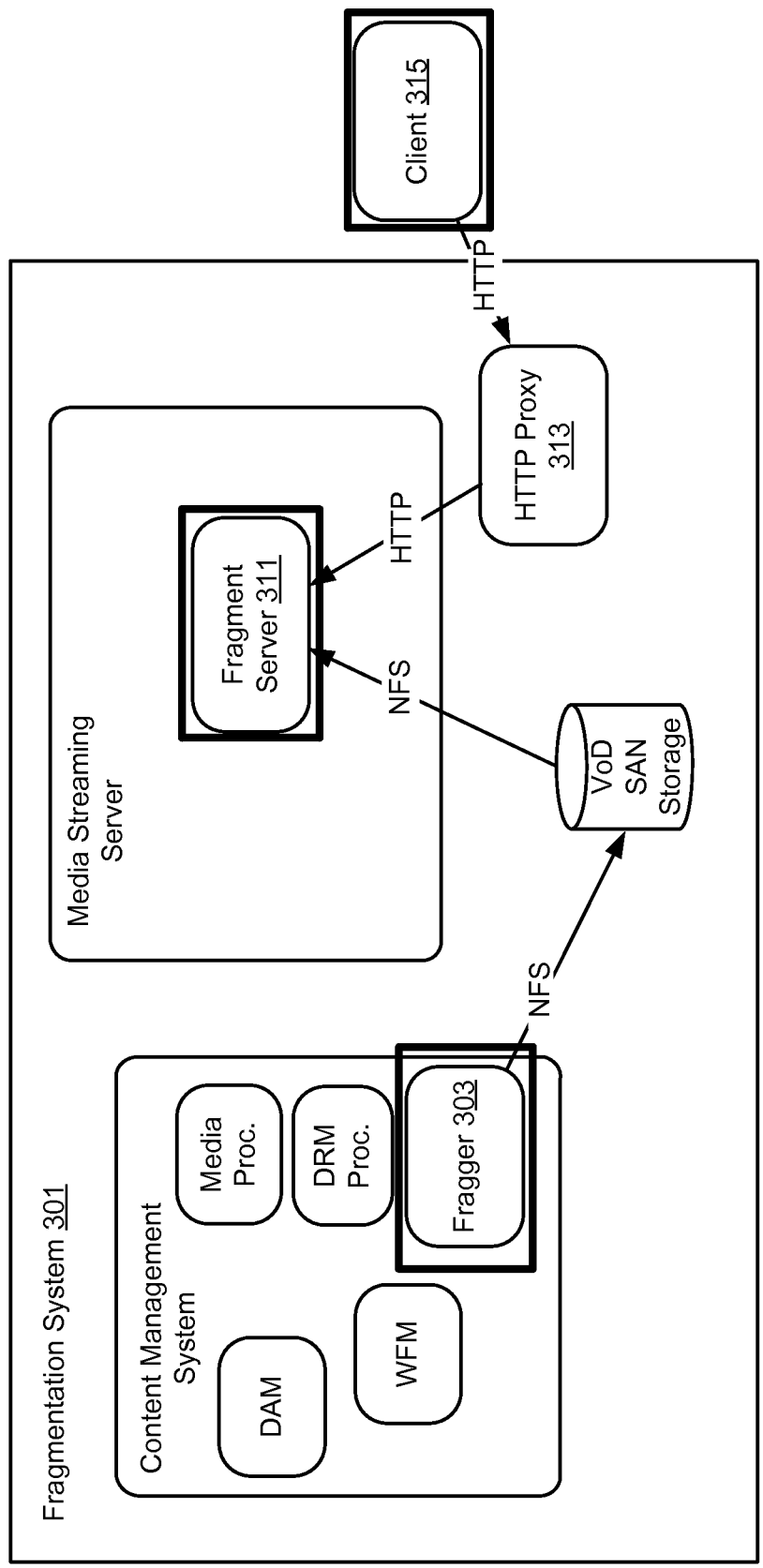

FIG. 3 illustrates one example of a fragmentation system 301 that can be used for video-on-demand (VoD) content. Fragger 303 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 311 provides the caching layer with fragments for clients. The design philosophy behind the client/server API minimizes round trips and reduces complexity as much as possible when it comes to delivery of the media data to the client 315. The fragment server 311 provides VoD content.

According to various embodiments, the client 315 uses a media component that requests fragmented MPEG-4 files, allows trick-play, and manages bandwidth adaptation. The client communicates with the application services associated with HTTP proxy 313 to get guides and present the user with the recorded content available.

Figure 4:
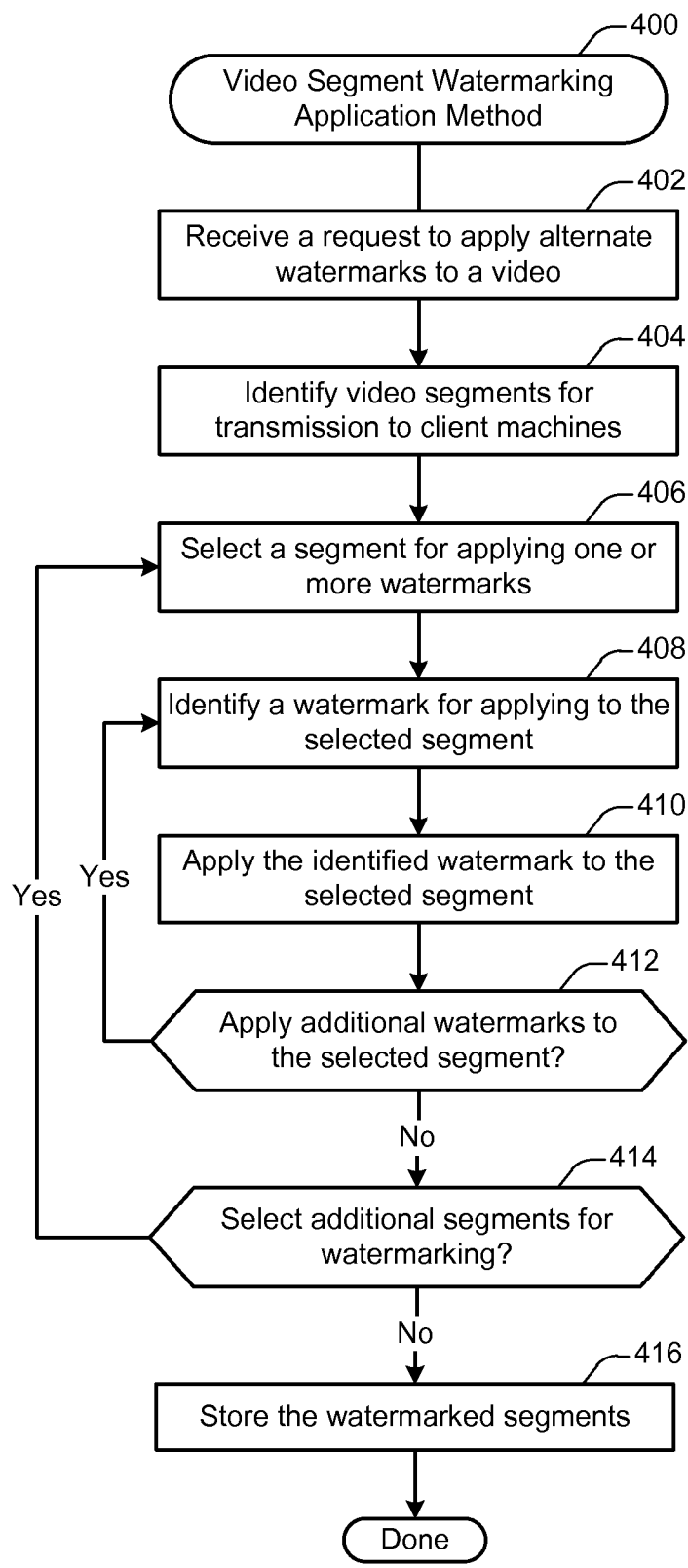
FIG. 4 illustrates an example of a method for video segment watermarking application method.

FIG. 4 illustrates an example of a video segment watermarking application method 400. According to various embodiments, the method 400 may be performed at a media system, such as the media systems discussed with respect to FIGS. 2 and 3. In particular embodiments, the method 400 may be performed at a transcoding system configured to transcode content from a content source to any of various content encodings. The transcoding system may be located within the media system or may be in communication with the media system via a network.

At 402, a request to apply alternate watermarks to a video is received. According to various embodiments, the request may be received as part of a procedure for encoding the video for transmission to client machines. For instance, a video content source item may be received at a media system from a content provider. Then, the video content source item may be transcoded into one or more encodings. The encodings may have a smaller file size, a different screen resolution, or other properties that differ from the video content source item and that make the encoding more suitable for transmission to client machines. After the encodings are created, they may be stored for transmission to the client machines. Since transcoding is typically resource-intensive, a content source item may be transcoded into one or more encodings and then stored for transmission to potentially many different client machines rather than generating a new encoding in response to each client machine request.

At 404, video segments for transmission to client machines are identified. According to various embodiments, the video content may be divided into any number of segments. The number of segments into which the video content is divided may be strategically determined based on factors that may include, but are not limited to: the size of the video content, the transmission techniques or data networks used to transmit the video content to client machines, the type of information that the video segment watermarks will include, and the encoding format used to encode the video content.

At 406, a segment for applying one or more watermarks is selected. In some cases, some segments may have watermarks while other segments do not. By reducing the number of segments that have watermarks, the amount of disk storage space necessary for storing the encoded and watermarked video content item may be reduced. In other cases, all or most segments may be watermarked. Increasing the number of segments that are watermarked may increase the number of bits that may be stored via watermarking and/or increase the robustness of the watermarking to future transformations such as truncation of the video content.

In some instances, a single instance of the data message may be distributed over the video content. Alternately, the data message may be repeated over the length of the video content. By repeating the data message, the message may be made robust against truncation of the video content. That is, if a portion of the video content is deleted, a complete copy of the data message may still be contained in the remaining portion of the video content. In addition, the data message may include forward error correction to make the message more robust.

At 408, a watermark for applying to the selected segment is identified. According to various embodiments, the watermark may be identified based on the amount of data to be encoded into each segment. For instance, each segment is encoded with four different watermarks, then the watermarks identified for application to a given segment may be the binary numbers "00", "01", "10", and "11". The actual watermarks applied to the selected segment may depend at least in part on the watermarking techniques used. For instance, the numbers may be represented as a pattern of sine waves, a pattern of dots, a gradient between waves or dots, or any other pattern.

According to various embodiments, the selected watermark may be composed mostly or entirely of low frequency elements. In addition, the watermark may be selected so as to not be obviously visible to the human eye during playback of the video and/or examination of the frame. Low frequency elements are visual features that change color or tone gradually rather than abruptly. For instance, a slight gradient is a low frequency feature while a sharp line is a high frequency feature. In particular embodiments, low frequency watermarks may be more difficult to remove via subsequent transcoding of the content. Alternately, or additionally, low frequency watermarks may be more difficult to perceive with the human eye.

At 410, the identified watermark is applied to the selected segment. In particular embodiments, the watermark may be applied to key frames within the selected segment. A video content segment may include any number of video content frames. These video frames may be presented in quick succession to provide the illusion of motion. The video frames may include both key frames and intermediate frames. A key frame in animation and filmmaking is a frame that defines the starting and ending points of a smooth transition. An intermediate frame is a frame between key frames that help to create the illusion of motion. Depending on the video application, two key frames may be separated by zero, one, several, or many intermediate frames. In some cases, intermediate frames may be created automatically or dynamically based on the key frames. For instance, the intermediate frames may be modified if the video content transmitted to the client machine is subsequently transcoded or otherwise altered. Accordingly, the watermark may be applied to one or more of the key frames within the selected segment. In some cases, the same watermark may be applied to more than one key frame, which may improve robustness since if one key frame is lost or altered, the watermark may still be detectable in another key frame.

According to various embodiments, the watermark may be applied according to any of various techniques. In particular embodiments, the watermark may be applied by superimposing a low frequency pattern to the image of the frame. For instance, a pattern of light and/or dark sine waves may be created. Each of the sine waves may represent a slight change to the underlying image frame. The superimposition of dark sine waves may cause the color values associated with pixels in the frame to be darkened slightly, while the superimposition of light sine waves may cause the color value associated with pixels in the frame to be lightened slightly. In some cases, the pixels near the sine waves may be similarly lightened or darkened in a gradient. A particular pattern of light and/or dark sine waves may be understood to represent a particular bit value or bit string, such as "1", "0", or "011".

In particular embodiments, the watermark may be applied in the frequency domain created during encoding. For instance, in many video transcoding and/or compression techniques, a video frame is transformed via a Discrete Cosine transform or another transform to characterize the frame by frequency. When the frame is characterized by frequency, the high frequency information in the frame may be separated from the low frequency information. High frequency information may represent areas of sharp differentiation, such as a black line on a white background. Low frequency information may represent areas of limited differentiation, such as an area of the image that is all a single color. To compress the image, some or all of the high frequency information may be blurred, softened, or dropped entirely. Accordingly, the watermark may be applied by making systematic changes to the low frequency areas of the image. For example, a "1" may be represented by making the image systematically darker according to some pattern, while a "0" may be represented by making the image systematically darker according to some pattern.

According to various embodiments, by modifying the image frame very slightly based on a pattern difficult to recognize, information may be stored in the image in a manner difficult to notice with the naked eye and difficult to detect via machine analysis. The particular patterns used to represent different bit values may be strategically determined based on factors such as the amount of information to store in the watermark, the degree to which particular patterns are observable to humans, the degree to which particular patterns are detectable by machines, and the degree to which particular patterns are likely to be altered by future modification or encoding of the video content.

According to various embodiments, a watermark may be read by isolating the watermarked frames. Then, each watermarked frame may be compared with a corresponding unwatermarked frame. The watermark may be isolated by identifying the difference between the two frames. Then, the watermark may be analyzed to determine the information encoded in it, such as the bit strings discussed with respect to operation.

At 412, a determination is made as to whether to apply additional watermarks to the selected segment. Determining whether to apply additional watermarks to segments involves a tradeoff between storage space on a storage medium and the number of bits encoded in the segment. If additional watermarks are applied to the selected segment, then the selected segment can be used to store more bits of the data message. However, each additional bit stored in the data segment increases the storage space requirements by a factor of two because twice as many copies of the segment will need to be stored to represent each additional bit.

Figure 5:
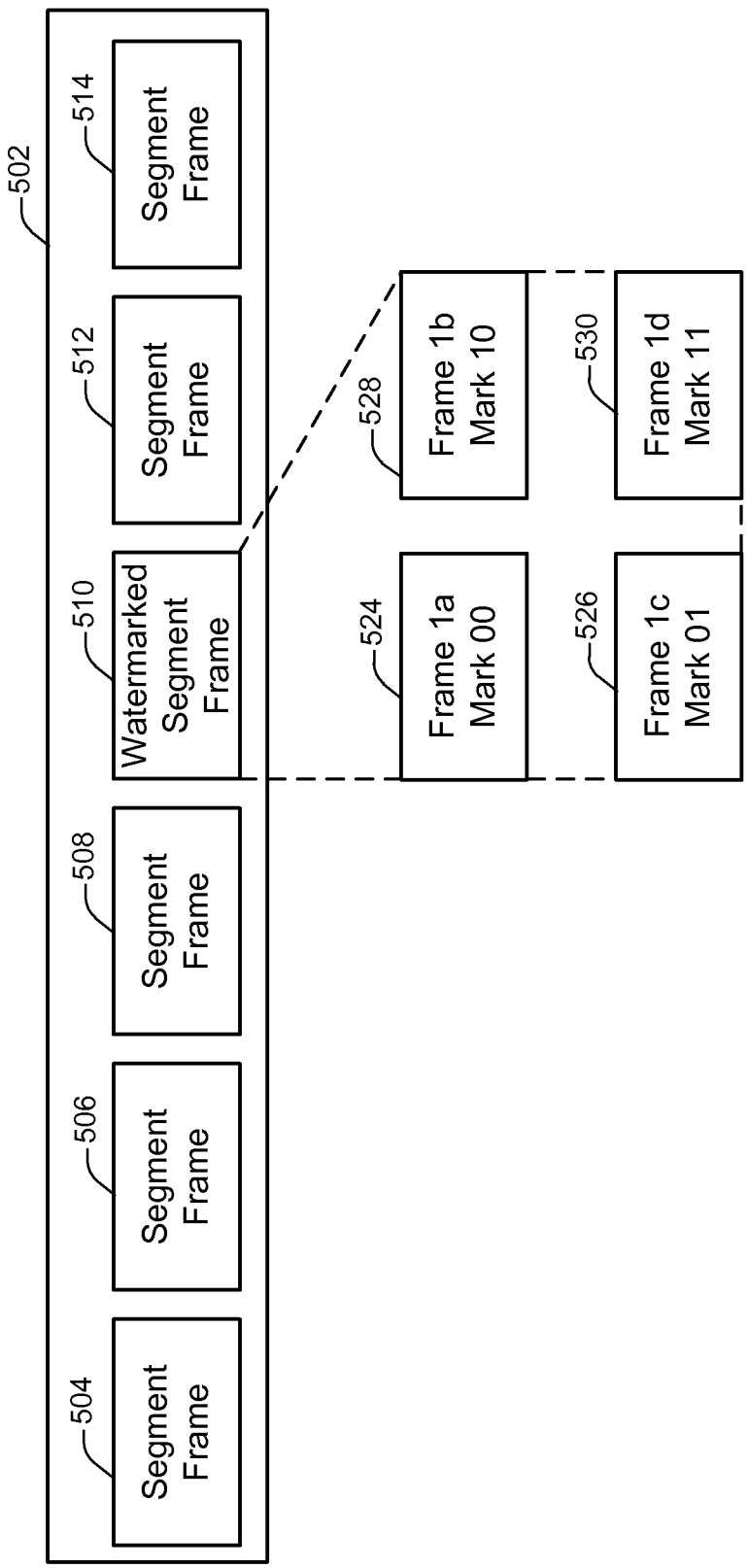
FIG. 5 illustrates an example of a video content segment 502.

For example, if two differently watermarked segments are created, then one bit of information may be stored because the two watermarks may be used to represent "1" and "0" respectively. If four differently watermarked segments are created, as shown in FIG. 5, then two bits of information may be stored because the four watermarks may be used to represent "00", "01", "10", and "11" respectively. More generally, $2^n$ differently watermarked segments may allow the encoding of n bits of information.

At 414, a determination is made as to whether to select additional segments for watermarking. According to various embodiments, the determination may be made based on various factors. For instance, in some cases additional segments may be selected until the data message determined at operation 406 is encoded. Alternately, additional segments may be selected until the end of the video content is reached. For example, the data message may be repeated until the end of the video content is reached.

At 416, the watermarked segments are stored. According to various embodiments, the watermarked segments may be stored for transmission to client devices. In particular embodiments, other segments that have not been watermarked may also be stored. For instance, a video may be composed of many thousands of fragments, only some of which are watermarked. The watermarked segments may be stored at a media server or at a storage system accessible to a media server. The media server may provide video content in response to requests from client machines.

FIG. 5 illustrates an example of a video content segment 502. According to various embodiments, the content segment 502 may be a single segment in a larger video content item. The video content item may be divided into segments to facilitate transmission to client machines. The video content item may be transmitted as individual segments as part of a video stream or may be transmitted as a unit that includes the individual segments. Although the content segment 502 is a segment of video content, other types of media, such as audio, may be similarly segmented.

According to various embodiments, the video content segment 502 may be created in a media system, such as the media systems discussed with respect to FIGS. 2 and 3. In particular embodiments, the video content segment 502 may be created via a video segment watermarking application method, an example of which is illustrated in FIG. 4.

The video content segment 502 includes the segment frames 504-514. The segment frames are still images which are combined in succession to form a moving picture that provides the appearance of actual motion. The segment frames may be created as part of a transcoding process that modifies a video content source item to fit an encoding format that designates properties such as frame resolution, bit rate, and a number of audio channels for a video.

According to various embodiments, the segment frames 504-514 may include both key frames and intermediate frames. A key frame in video is a frame that defines a complete still picture, and is used as the starting and ending points of a smooth transition or interpolation between key frames. An intermediate frame is a frame between key frames that help to create the illusion of motion. Depending on the video application, two key frames may be separated by zero, one, several, or many intermediate frames.

According to various embodiments, one or more of the segment frames may be key frames, as discussed with respect to FIG. 4. For instance, the segment frame 504 and the watermarked segment frame 510 may be key frames. In particular embodiments, key frames may be chosen for watermark application because they are typically less subject to modification that intermediate frames, as discussed with respect to FIG. 4.

The watermarked segment frame 510 has had a watermark applied to it, as discussed with respect to FIG. 4. In the example shown in FIG. 5, the watermark may be "00", as shown in the Frame 1*a* 524, "10", as shown in the Frame 1*b* 528, "01", as shown in the Frame 1*c* 526, or "11", as shown in the Frame 1*d* 530. Although the watermarks shown in FIG. 5 are binary numbers, any type of watermark may be used.

According to various embodiments, four copies of the video content segment 502 may be stored for transmission to client machines. The four copies may be the same or similar except for the watermark. That is, each of the four copies may have a different one of the watermarked frames 524-530 stored in the place of the watermarked segment frame 510. In this way, information can be encoded in the video content segment 502 when the content is transmitted to the client machine by selecting the appropriate video content segment for transmission. For instance, to encode the data "10", the system would select the version of the video content segment 502 that includes the Frame 1*b* 528.

According to various embodiments, by selecting between such alternate encodings for various video content segments in a video content item, the system may encode larger amounts of data. For example, the system could select from different available video segments at different places in a video stream to encode data such as the binary number "1001 1110 1011 0101" in a video content item. As discussed with respect to FIG. 4, various types of information may be encoded in this way, such as an identifier corresponding to a user account. The transmission of video watermarked in this fashion to client machines is discussed in additional detail with respect to FIG. 7.

According to various embodiments, the amount of information that may be contained in a segment frame may be limited by the number of alternate watermarks available for the segment frame. For example, if two alternate watermarks are available, then one bit of information may be stored. If four alternate watermarks are available, as shown in FIG. 5, then two bits of information may be stored. If eight alternate watermarks available, then three bits of information may be stored. More generally, $2^n$ alternate watermarks may allow the encoding of n bits of information.

Figure 6:
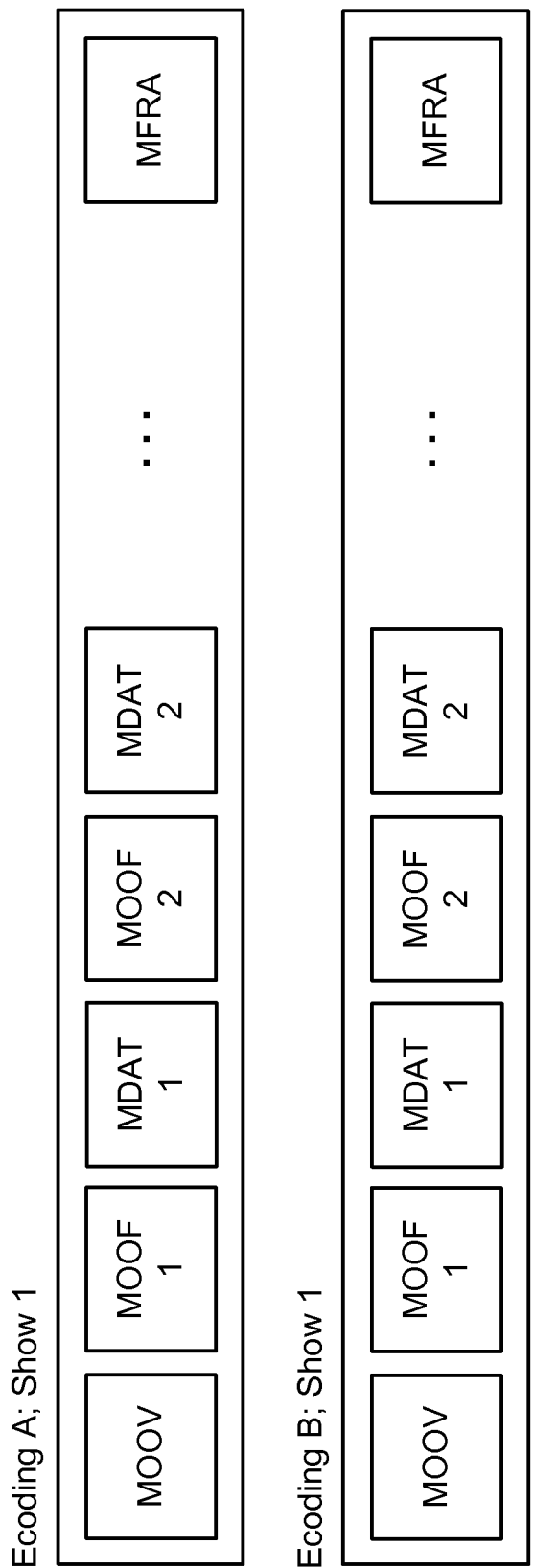
FIG. 6 illustrates examples of encoding streams.

FIG. 6 illustrates examples of files stored by the fragment writer. According to various embodiments, the fragment writer is a component in the overall fragmenter. It is a binary that uses command line arguments to record a particular program based on either NTP time from the encoded stream or wallclock time. In particular embodiments, this is configurable as part of the arguments and depends on the input stream. When the fragment writer completes recording a program, it exits. For live streams, programs are artificially created to be short time intervals e.g. 5-15 minutes in length.

According to various embodiments, the fragment writer command line arguments are the SDP file of the channel to record, the start time, end time, name of the current and next output files. The fragment writer listens to RTP traffic from the live video encoders and rewrites the media data to disk as fragmented MPEG-4. According to various embodiments, media data is written as fragmented MPEG-4 as defined in MPEG-4 part 12 (ISO/IEC 14496-12). Each broadcast show is written to disk as a separate file indicated by the show ID (derived from EPG). Clients include the show ID as part of the channel name when requesting to view a prerecorded show. The fragment writer consumes each of the different encodings and stores them as a different MPEG-4 fragment.

In particular embodiments, the fragment writer writes the RTP data for a particular encoding and the show ID field to a single file. Inside that file, there is metadata information that describes the entire file (MOOV blocks). Atoms are stored as groups of MOOF/MDAT pairs to allow a show to be saved as a single file. At the end of the file there is random access information that can be used to enable a client to perform bandwidth adaptation and trick play functionality.

According to various embodiments, the fragment writer includes an option which encrypts fragments to ensure stream security during the recording process. The fragment writer will request an encoding key from the license manager. The keys used are similar to that done for DRM. The encoding format is slightly different where MOOF is encoded. The encryption occurs once so that it does not create prohibitive costs during delivery to clients.

The fragment server responds to HTTP requests for content. According to various embodiments, it provides APIs that can be used by clients to get necessary headers required to decode the video and seek any desired time frame within the fragment and APIs to watch channels live. Effectively, live channels are served from the most recently written fragments for the show on that channel. The fragment server returns the media header (necessary for initializing decoders), particular fragments, and the random access block to clients. According to various embodiments, the APIs supported allow for optimization where the metadata header information is returned to the client along with the first fragment. The fragment writer creates a series of fragments within the file. When a client requests a stream, it makes requests for each of these fragments and the fragment server reads the portion of the file pertaining to that fragment and returns it to the client.

According to various embodiments, the fragment server uses a REST API that is cache-friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

In particular embodiments, client requests for fragments follow the following format: http://{HOSTNAME}/frag/{CHANNEL}/{BITRATE}/[{ID}/]{COMMAND}[/{ARG}] e.g. http://frag.hosttv.com/frag/1/H8QVGAH264/1270059632.mp4/fragment/42. According to various embodiments, the channel name will be the same as the backend-channel name that is used as the channel portion of the SDP file. VoD uses a channel name of "vod". The BITRATE should follow the BITRATE/RESOLUTION identifier scheme used for RTP streams. The ID is dynamically assigned. For live streams, this may be the UNIX timestamp; for DVR this will be a unique ID for the show; for VoD this will be the asset ID. The ID is optional and not included in LIVE command requests. The command and argument are used to indicate the exact command desired and any arguments. For example, to request chunk 42, this portion would be "fragment/42".

The URL format makes the requests content delivery network (CDN) friendly because the fragments will never change after this point so two separate clients watching the same stream can be serviced using a cache. In particular, the head end architecture leverages this to avoid too many dynamic requests arriving at the Fragment Server by using an HTTP proxy at the head end to cache requests.

According to various embodiments, the fragment controller is a daemon that runs on the fragmenter and manages the fragment writer processes. A configured filter that is executed by the fragment controller can be used to generate the list of broadcasts to be recorded. This filter integrates with external components such as a guide server to determine which shows to record and which broadcast ID to use.

According to various embodiments, the client includes an application logic component and a media rendering component. The application logic component presents the user interface (UI) for the user, communicates to the front-end server to get shows that are available for the user, and authenticates the content. As part of this process, the server returns URLs to media assets that are passed to the media rendering component.

In particular embodiments, the client relies on the fact that each fragment in a fragmented MP4 file has a sequence number. Using this knowledge and a well-defined URL structure for communicating with the server, the client requests fragments individually as if it was reading separate files from the server simply by requesting URLs for files associated with increasing sequence numbers. In some embodiments, the client can request files corresponding to higher or lower bit rate streams depending on device and network resources.

Since each file contains the information needed to create the URL for the next file, no special playlist files are needed, and all actions (startup, channel change, seeking) can be performed with a single HTTP request. After each fragment is downloaded, the client assesses, among other things, the size of the fragment and the time needed to download it in order to determine if downshifting is needed or if there is enough bandwidth available to request a higher bit rate.

Because each request to the server looks like a request to a separate file, the response to requests can be cached in any HTTP Proxy, or be distributed over any HTTP based content delivery network CDN.

Figure 7:
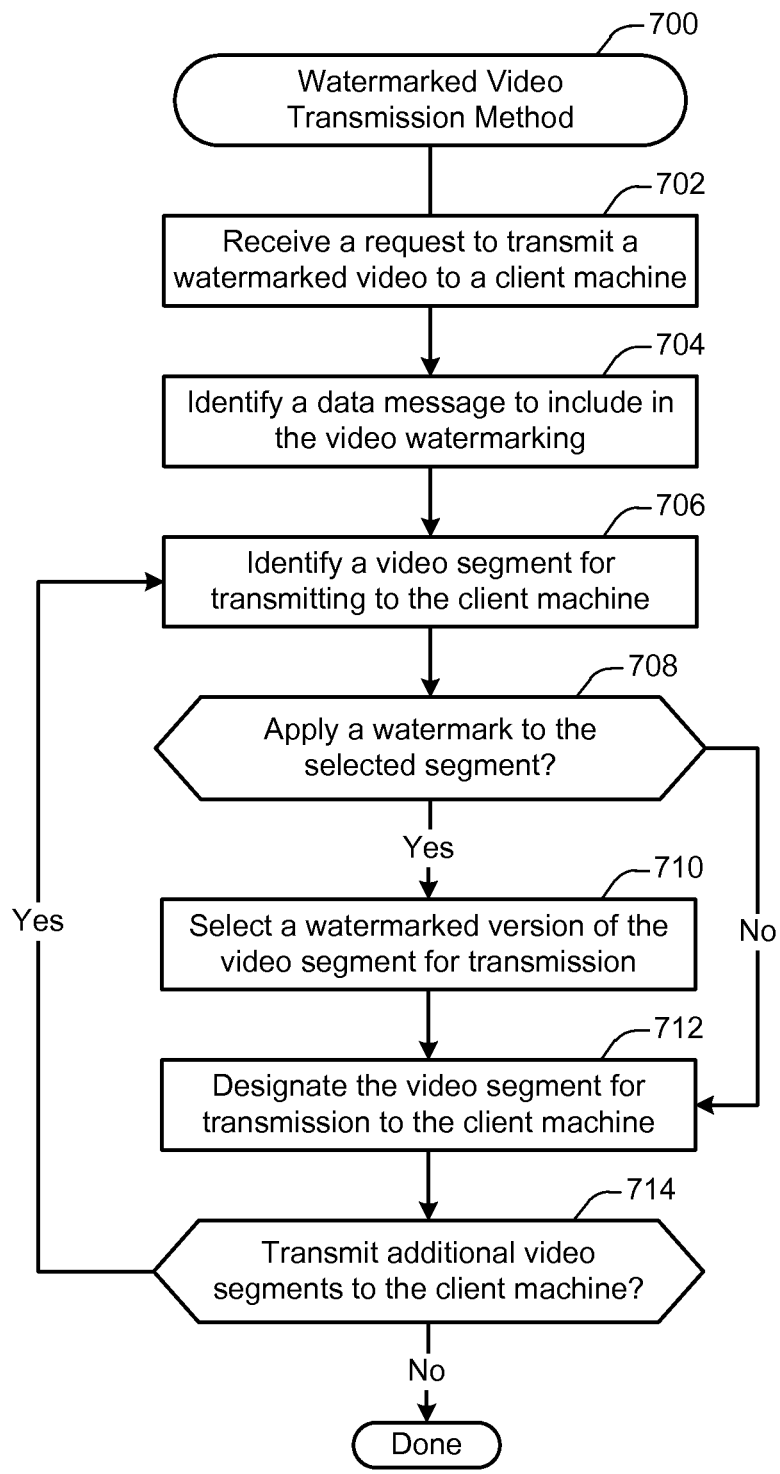
FIG. 7 illustrates one example of a method for transmitting watermarked video to client machines.

FIG. 7 illustrates a method 700 for transmitting watermarked video to a client machine. According to various embodiments, the method 700 may be performed at a media system such as the media systems discussed with respect to FIGS. 2 and 3. The method 700 may be used to encode an individualized message in video content transmitted to a client machine. The message may be encoded by selecting watermarked video content segments to include in the transmitted video content.

At 702, a request to transmit a watermarked video to a client machine is received. According to various embodiments, the request may be received at a server configured to provide media content services to a number of client machines. The client machines may transmit requests for content, and the server may provide the content to the client machines. According to various embodiments, the content may be received from any number of content sources. The content may then be transmitted to any number of devices associated with a content management account administered by the servers.

At 704, a data message for including in the video is determined. According to various embodiments, various types of information may be included in the data message. For example, the data message may identify a content provider or other content source. As another example, the data message may identify the video content recipient. For instance, the data message may include an account identifier associated with a content management account. Then, the video content that includes the data message may be transmitted to a client machine associated with the content management account.

At 706, a video segment is identified for transmitting to the client machine. According to various embodiments, the video segment identified may be the next video segment that has not yet been transmitted to the client machine. As discussed with respect to FIGS. 4 and 5, a video content item may be divided into a number of segments for transmission to client machines. Some or all of the segments may be encoded with watermarks. The segments may be stored so that when the video is transmitted to client machines, watermarked segments may be selected to encode a message in the transmitted video.

At 708, a determination is made as to whether to apply a watermark to the selected segment. According to various embodiments, a watermark may be applied if the segment has been transcoded to have alternate encodings with different watermarks. In particular embodiments, the watermark may not actually be encoded in the segment when the method 700 is performed. Instead, a segment already encoded with a watermark and stored for transmission to client machines may be selected for including within the video content. Techniques for encoding video segments with watermarks are discussed in additional detail with respect to FIG. 4.

At 710, a watermarked version of the video segment is selected for transmission. According to various embodiments, the selection of the watermarked version of the video segment may be based at least in part on the data identified in operation 704. For instance, suppose that the data identified at operation 704 is the binary string "101100101" and that each segment is encoded with four alternate watermarks that can collectively encode two bits. Then, the first watermarked segment selected may have a watermark corresponding to the binary string "10", while the second watermarked segment selected may have a watermark corresponding to the binary bit string "11".

At 712, the video segment is designated for transmission to the client machine. According to various embodiments, the video segment may be transmitted directly to the client machine. Alternately, the video segment may be stored in a location to prepare for transmission. For instance, the video segment may be stored in a transmission buffer.

At 714, a determination is made as to whether to transmit additional video segments to the client machine. According to various embodiments, the determination may be made at least in part based on the length of the video. For instance, a video may be divided into a designated number of video segments. The video segments may continue to be transmitted until no more video segments in the video remain untransmitted. Alternately, or additionally, the transmission of additional video segments may be terminated based on another factor, such as a message received from the client machine. For example, the client machine may transmit a request to pause or stop transmission of the video content. As another example, the communication with the client machine may be severed.

Figure 8:
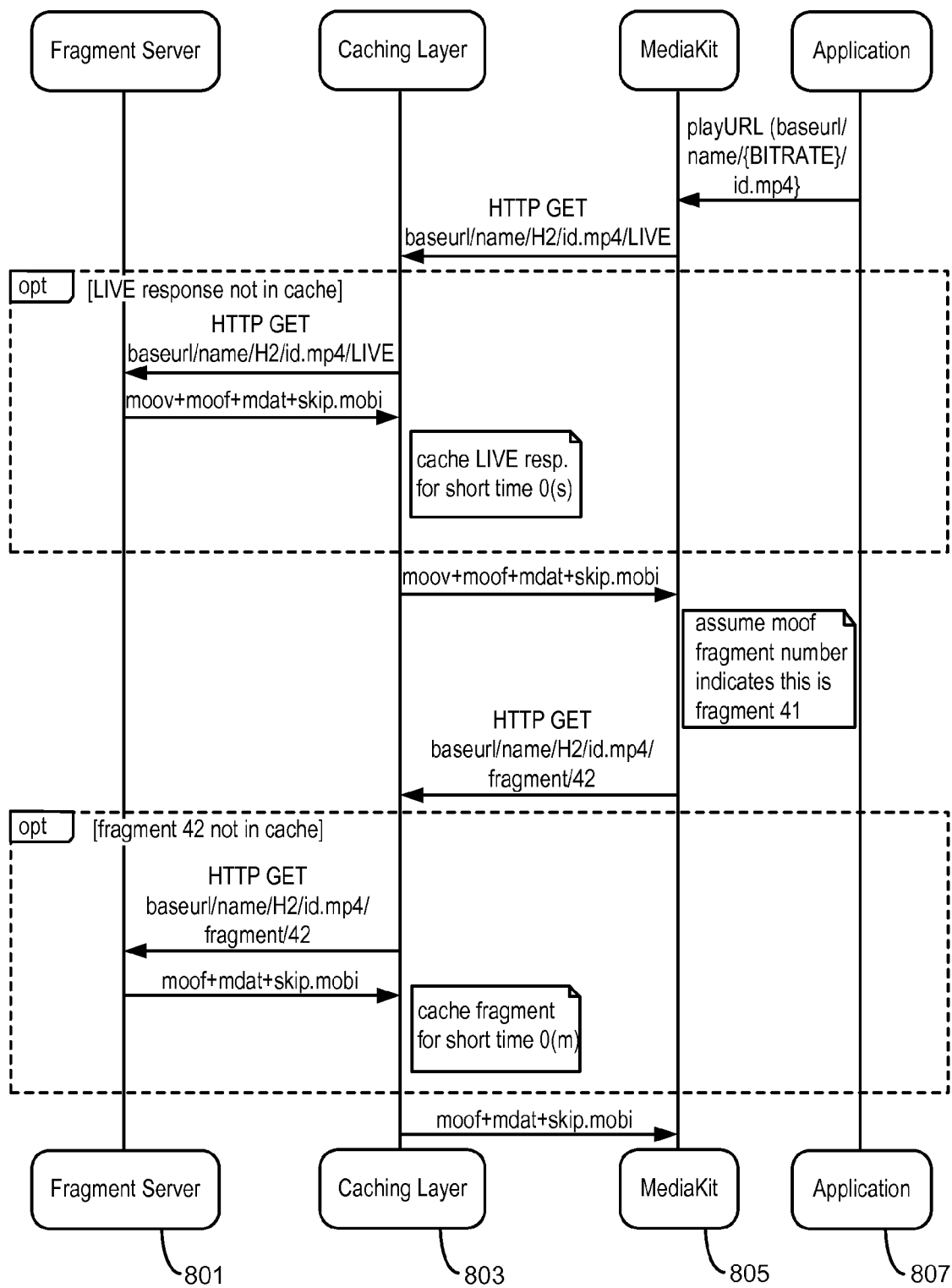
FIG. 8 illustrates one example of an exchange used with a media delivery system.

FIG. 8 illustrates an interaction for a client receiving a media stream such as a live stream. The client starts playback when fragment 81 plays out from the server. The client uses the fragment number so that it can request the appropriate subsequent file fragment. An application such as a player application 807 sends a request to mediakit 805. The request may include a base address and bit rate. The mediakit 805 sends an HTTP get request to caching layer 803. According to various embodiments, the live response is not in cache, and the caching layer 803 forwards the HTTP get request to a fragment server 801. The fragment server 801 performs processing and sends the appropriate fragment to the caching layer 803 which forwards to the data to mediakit 805.

The fragment may be cached for a short period of time at caching layer 803. The mediakit 805 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 805 may request a next fragment having a different data rate. In some instances, the mediakit 805 may request a next fragment having a higher data rate. According to various embodiments, the fragment server 801 maintains fragments for different quality of service streams with timing synchronization information to allow for timing accurate playback.

The mediakit 805 requests a next fragment using information from the received fragment. According to various embodiments, the next fragment for the media stream may be maintained on a different server, may have a different bit rate, or may require different authorization. Caching layer 803 determines that the next fragment is not in cache and forwards the request to fragment server 801. The fragment server 801 sends the fragment to caching layer 803 and the fragment is cached for a short period of time. The fragment is then sent to mediakit 805.

Figure 9:
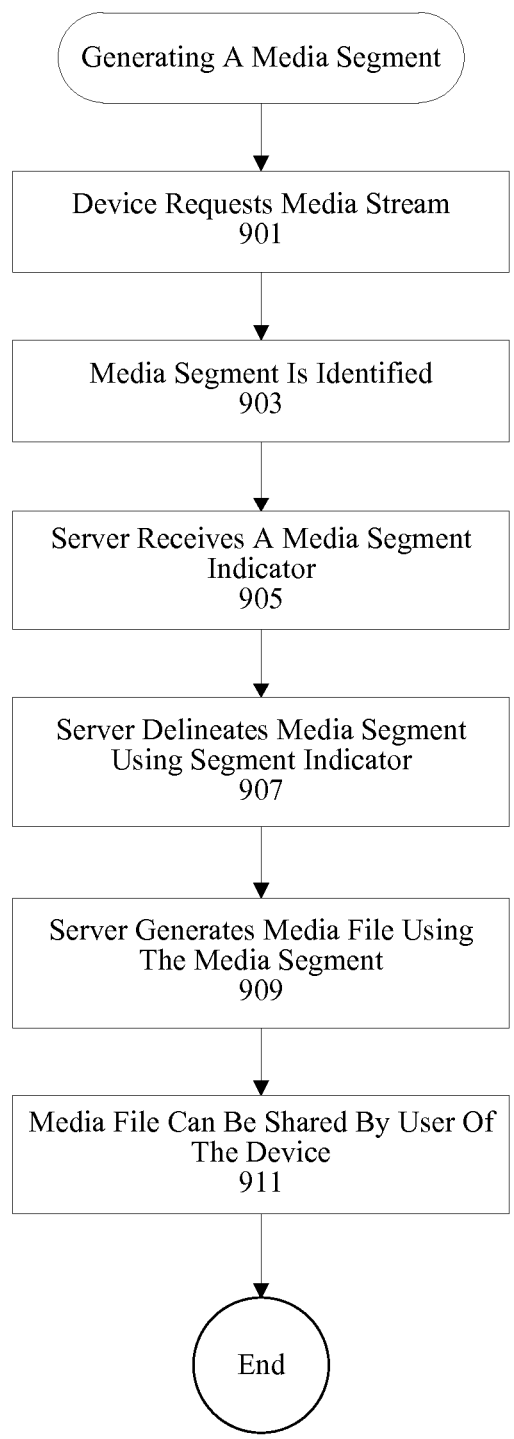
FIG. 9 illustrates one technique for generating a media segment.

FIG. 9 illustrates a particular example of a technique for generating a media segment. According to various embodiments, a media stream is requested by a device at 901. The media stream may be a live stream, media clip, media file, etc. The request for the media stream may be an HTTP GET request with a baseurl, bit rate, and file name. At 903, the media segment is identified. According to various embodiments, the media segment may be a 35 second sequence from an hour long live media stream. The media segment may be identified using time indicators such as a start time and end time indicator. Alternatively, certain sequences may include tags such as fight scene, car chase, love scene, monologue, etc., that the user may select in order to identify a media segment. In still other examples, the media stream may include markers that the user can select. At 905, a server receives a media segment indicator such as one or more time indicators, tags, or markers. In particular embodiments, the server is a snapshot server, content server, and/or fragment server. According to various embodiments, the server delineates the media segment maintained in cache using the segment indicator at 907. The media stream may only be available in a channel buffer. At 909, the server generates a media file using the media segment maintained in cache. The media file can then be shared by a user of the device at 911. In some examples, the media file itself is shared while in other examples, a link to the media file is shared.

Figure 10:
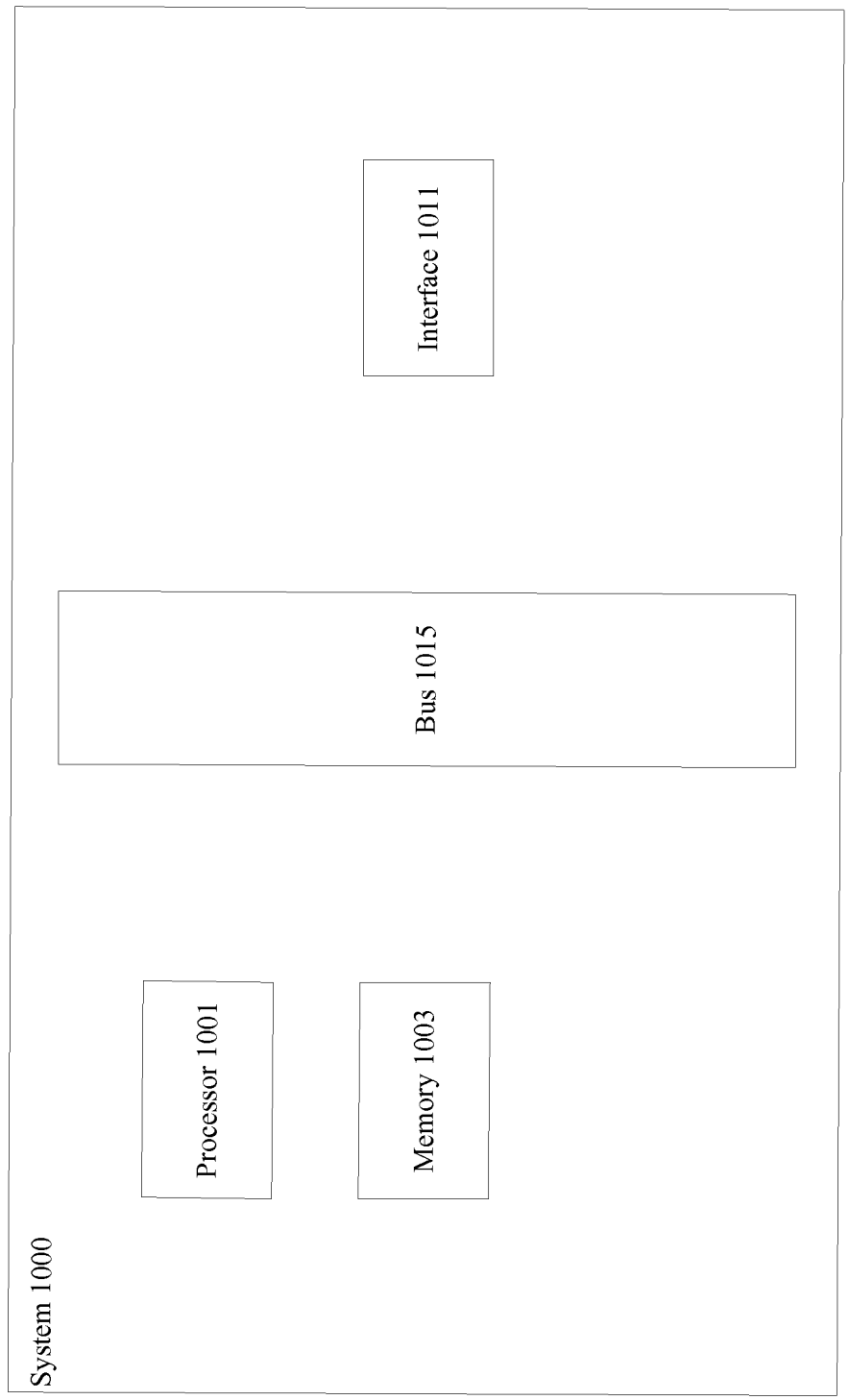
FIG. 10 illustrates one example of a system.

FIG. 10 illustrates one example of a server. According to particular embodiments, a system 1000 suitable for implementing particular embodiments of the present invention includes a processor 1001, a memory 1003, an interface 1011, and a bus 1015 (e.g., a PCI bus or other interconnection fabric) and operates as a streaming server. When acting under the control of appropriate software or firmware, the processor 1001 is responsible for modifying and transmitting live media data to a client. Various specially configured devices can also be used in place of a processor 1001 or in addition to processor 1001. The interface 1011 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1000 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
receiving a request to transmit, to a client machine, video content including a digital watermarking message, the video content being based on a video content distribution item, the video content distribution item being divided into a plurality of video content segments, designated ones of the video content segments having a respective plurality of alternate video content segment encodings, each of the alternate video content segment encodings including a respective digital watermark, each of the digital watermarks encoding a respective first binary number, wherein different digital watermarks encode different information within the alternate video content segment encodings;
for each of the designated video content segments, selecting one of the respective alternate video content segment encodings to create the digital watermarking message to include in the video content, wherein the digital watermarking message comprises a second binary number, and wherein the alternate video content segment encodings are selected so that the information encoded in the selected alternate video content segment encodings matches the second binary number; and
transmitting the video content to the client machine, the video content including the selected video content segment encodings.

2. The method recited in claim 1, wherein the digital watermarks are not perceptible to the human eye.

3. The method recited in claim 1, wherein the digital watermarking message includes an account identifier identifying a content management account, the client machine being associated with the content management account.

4. The method recited in claim 1, wherein selected ones of the digital watermarks comprise a respective low frequency image capable of being superimposed on a video frame.

5. The method recited in claim 1, wherein selected ones of the digital watermarks comprise a low frequency pattern capable of being superimposed on a video frame that has been transformed to a frequency domain.

6. The method recited in claim 1, wherein the number of alternate video content segment encodings for each video content segment is two raised to the power n for some integer n, and wherein n bits of information may be encoded for each of the video content segments by selecting one of the respective alternate video content segment encodings.

7. A system comprising:
a storage medium operable to store a video content distribution item, the video content distribution item being divided into a plurality of video content segments, designated ones of the video content segments having a respective plurality of alternate video content segment encodings, each of the alternate video content segment encodings including a respective digital watermark, each of the digital watermarks encoding a respective first binary number, wherein different digital watermarks encode different information within the alternate video content segment encodings;
a processor operable to select, for each of the designated video content segments, one of the respective alternate video content segment encodings to create a digital watermarking message to include in video content for transmission to a client machine wherein the digital watermarking message comprises a second binary number, and wherein the alternate video content segment encodings are selected so that the information encoded in the selected alternate video content segment encodings matches the second binary number; and
a communications interface operable to transmit the video content to the client machine, the video content including the selected video content segment encodings.

8. The system recited in claim 7, wherein the digital watermarks are not perceptible to the human eye.

9. The system recited in claim 7, wherein the digital watermarking message includes an account identifier identifying a content management account, the client machine being associated with the content management account.

10. The system recited in claim 7, wherein selected ones of the digital watermarks comprise a respective low frequency image capable of being superimposed on a video frame.

11. The system recited in claim 7, wherein selected ones of the digital watermarks comprise a low frequency pattern capable of being superimposed on a video frame that has been transformed to a frequency domain.

12. The system recited in claim 7, wherein the number of alternate video content segment encodings for each video content segment is two raised to the power n for some integer n, and wherein n bits of information may be encoded for each of the video content segments by selecting one of the respective alternate video content segment encodings.

13. One or more non-transitory computer readable media having instructions stored thereon for performing a method, the method comprising:
receiving a request to transmit, to a client machine, video content including a digital watermarking message, the video content being based on a video content distribution item, the video content distribution item being divided into a plurality of video content segments, designated ones of the video content segments having a respective plurality of alternate video content segment encodings, each of the alternate video content segment encodings including a respective digital watermark, each of the digital watermarks encoding a respective first binary number, wherein different digital watermarks encode different information within the alternate video content segment encodings;
for each of the designated video content segments, selecting one of the respective alternate video content segment encodings to create the digital watermarking message to include in the video content wherein the digital watermarking message comprises a second binary number, and wherein the alternate video content segment encodings are selected so that the information encoded in the selected alternate video content segment encodings matches the second binary number; and transmitting the video content to the client machine, the video content including the selected video content segment encodings.

14. The one or more computer readable media recited in claim 13, wherein the digital watermarks are not perceptible to the human eye.

15. The one or more computer readable media recited in claim 13, wherein the digital watermarking message includes an account identifier identifying a content management account, the client machine being associated with the content management account.

16. The one or more computer readable media recited in claim 13, wherein selected ones of the digital watermarks comprise a respective low frequency image capable of being superimposed on a video frame.

* * * * *